Oct. 12, 1926.  
T. W. ROSS ET AL  
1,602,942  
AUTOMATIC CONVERTER STATION  
Filed June 28, 1923

WITNESSES:

INVENTORS  
Thomas W. Ross.  
Clifford Ryder.  
BY  
ATTORNEY

Patented Oct. 12, 1926.

BEST AVAILABLE COPY 1,602,942

UNITED STATES PATENT OFFICE.

THOMAS WYLIE ROSS, OF MANCHESTER, AND CLIFFORD RYDER, OF FAILSWORTH, ENGLAND, ASSIGNORS TO WESTINGHOUSE ELECTRIC AND MANUFACTURING COMPANY, A CORPORATION OF PENNSYLVANIA.

AUTOMATIC CONVERTER STATION.

Application filed June 28, 1923, Serial No. 648,244, and in Great Britain July 7, 1922.

This invention relates to electric motor converter substations in which alternating electric currents are transformed into direct electric currents by means of what are commonly known as motor converters which differ from rotary converters by reason of the fact that distinct though interconnected windings are provided for the alternating and direct current parts of the machine respectively.

The object of the invention is to provide means for automatically starting and synchronizing the motor converter at a substation and also to provide improved safety devices in connection therewith as hereinafter set forth.

An important feature of the invention consists in the provision of means comprising a low voltage or low current relay in conjunction with a time measuring device for use during the starting of the converter. These two devices may be combined in one apparatus.

Other features of the invention consist in the provision of means whereby a resistance is automatically inserted in the direct current shunt field winding circuit of the converter in order to facilitate starting, and means whereby the machine is prevented from attaining a high speed due to the direct current field failing to excite.

Further important features of the invention relate to the interlocking of the devices for short-circuiting the slip rings on the alternating current side of the machine with the alternating current circuit closing switch and with the circuit closing switch or switches on the direct current side so that alternating current power cannot be supplied to the converter to start the machine until the short circuit is removed from the slip rings and direct current cannot be supplied from the machine to the work circuit until the slip rings are short circuited. Means are furthermore provided by which, when the machine is to be stopped, the alternating current side cannot be disconnected from the supply mains until the direct-current side has been disconnected from the work circuit.

Figure 1:
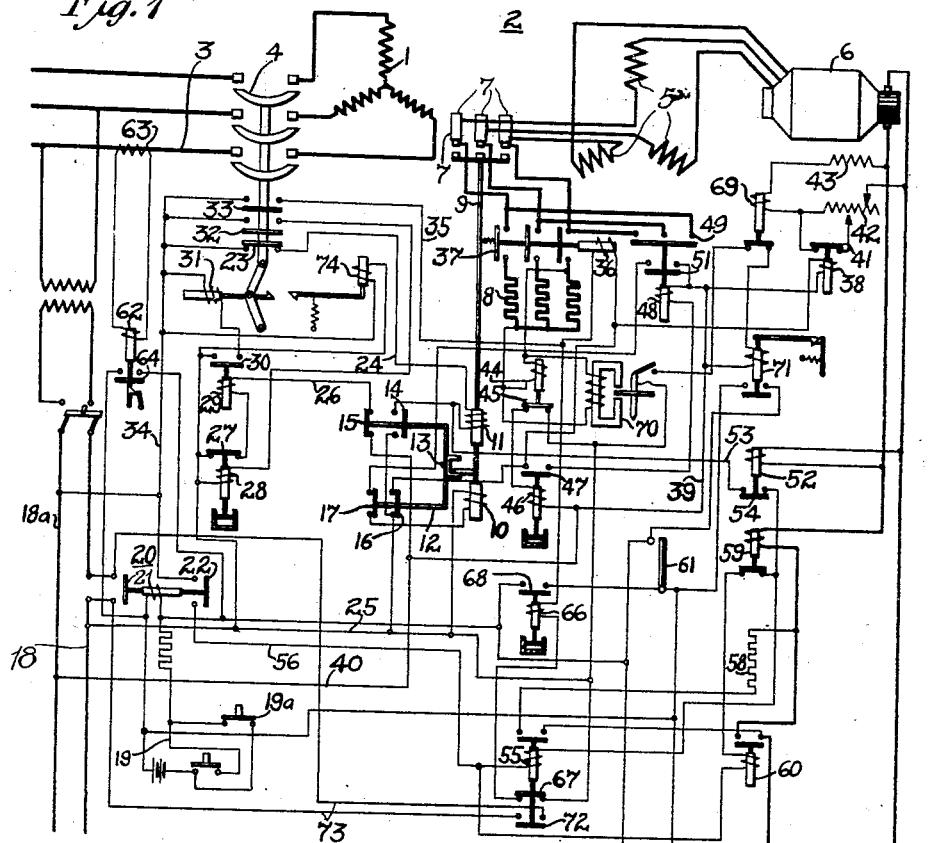
Figure 2:
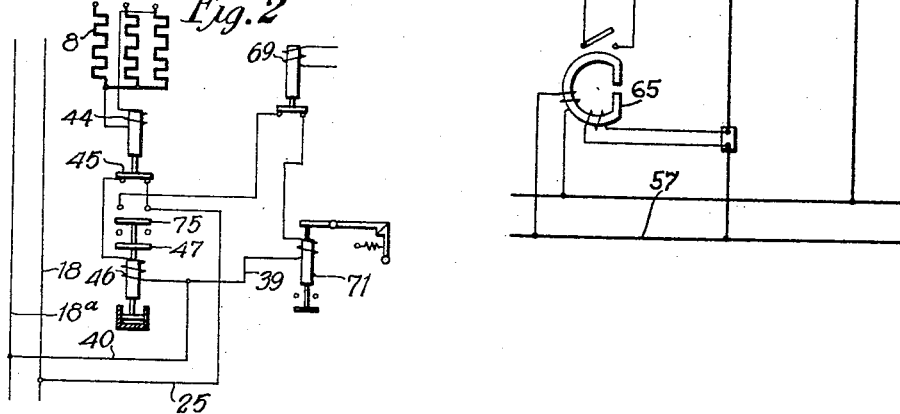

In order that the nature of the invention may be clearly understood, it will now be described with reference to the accompanying drawings, in which Figure 1 is an electrical diagram illustrating a system arranged according to the invention and embodying the features above mentioned, and Figure 2 illustrates a modification of a portion of the system shown in Figure 1.

As illustrated in Fig. 1, the stator winding 1 of the induction motor side of a motor converter 2 is supplied with alternating current power from the circuit 3 through a main circuit interrupter 4 which is provided with an operating coil and no-volt coil in the usual manner; the rotor 5 of the motor converter is electrically connected to the direct current armature 6. The rotor is shown as wound with three phases, it being understood that any suitable number of phases may be employed. In the particular type of motor converter illustrated, which is well known, the ends of the rotor windings are brought out to slip rings 7 in order that starting resistors 8 may be connected in series with the windings.

A device 9 is provided for short-circuiting the slip rings. Any form of slip ring short-circuiting device may be employed but in the case illustrated, the device is moved by means of solenoids 10 and 11 to short or open circuit the slip rings. A lever 12 is movable about a pivot 13 and is operated at the end of the travel of the short-circuiting device 9 in the one or other direction to close or open a series of contacts 14, 15, 16 and 17.

The control system is energized from the circuit 3 through a transformer and bus-bar conductors 18 and 18$^a$ which are energized upon the closure of a master relay 20. The master relay may be operated through pilot wires 19 from a distant point by means of a time switch or a low voltage direct-current relay 19$^a$ which indicates when the voltage of the direct-current system is low or it may be operated by any other means.

The operation of the system is as follows:
Assuming the converter is at standstill and the slip rings 7 on the rotor 5 are short-circuited by the slip ring short-circuiting device 9 and it is desired to start the machine into operation, the pilot wires 19 are energized. This energizes the master relay 20 which has two sets of contact members 21 and 22. On the closure of the contact members 21, the control bus-bars 18 and 18$^a$ will be energized from some convenient source of alternating or direct current supply, illustrated herein as a transformer connected to the circuit 3.

Thereupon a circuit will be established from the control bus-bar 18ª through conductor 34, interlock 23, which is closed when the main interrupter 4 is open, conductor 24, solenoid 11, contacts 14, which are closed as the short-circuiting device 9 is in the position to short-circuit the slip rings 7 and thence through conductor 25 to the control bus-bar 18. The coil 11 is energized and the short-circuiting device 9 is removed from the slip rings.

As the short-circuiting device reaches the end of its travel, it moves the lever device 12 to open contacts 14 and close contacts 15, 16 and 17. The contact 15 closes a circuit from control bus-bar 18ª through conductors 40 and 26, energizing coil of a relay 29, contacts 27 of a time-lag relay 28, which is closed when the relay 28 is deenergized, and thence to the bus-bar 18. The relay 29 closes the contacts 30 whereupon the closing coil 31 of the circuit interrupter 4 is energized to close the circuit interrupter and allow power to be supplied from the circuit 3 to the stator 1 on the alternating-current side of the converter. The closure of interrupter 4 opens the contacts 23 and closes the contacts 32 and 33. The interrupter 4 in the preferred form is retained closed by means of a mechanical latch.

The contacts 32, when closed, energize the time-lag relay 28 from the bus-bars 18 and 18ª through conductor 34. After a predetermined interval of time, the relay 28 opens its contacts 27 and thereby opens the circuit of the operating coil of the relay 29 so that the closing coil 31 of the interrupter 4 is deenergized. The interrupter 4 remains closed, however, as the no-volt coil 74 is energized directly from the control bus-bars 18 and 18ª.

The opening of the contacts 23, upon the closure of the interrupter 4, further opens the circuit of the operating coil 11 of the slip ring short-circuiting device which does not, however, change its position.

The contacts 33, in closing, complete a circuit from the control bus-bar 18ª through conductor 34, contacts 33, conductor 35, through the operating coil 36, contacts 16, which are closed, to the control bus-bar 18. The energization of the operating coil 36 causes the contactors 37 to be closed whereupon the starting resistances 8 are inserted in the circuit of the three phases of the rotor windings through the slip rings 7.

When the contacts 16 were closed by the actuation of the short-circuiting device 9, a relay coil 38 was energized from a circuit established from the control bus-bar 18 through conductor 25, contacts 16, relay coil 38, and conductors 39 and 40 to the bus-bar 18ª. On being energized the relay 38 opens its contact 41 which normally short-circuits a portion of the resistance 42 in series with shunt field windings 43 on the direct-current side of the motor converter. Thus extra resistance is inserted in the circuit of the shunt field windings during starting to permit the motor converter to start more easily by reason of the reduced field excitation.

A sensitive relay 44 of any well known design is connected in shunt relation across one of the starting resistors 8, the function of this relay being to close its contacts 45 when the voltage drop across the slip rings of the rotor falls to a predetermined amount. When the starting resistors 8 are connected across the slip rings, the converter will start to rotate, and will run up to slightly above the synchronous speed of the motor converter by which time the direct-current field will have built up sufficiently to cause an electromotive force to be induced across the direct-current armature 6 of the motor converter. This will cause the speed of the converter to fall again until synchronous speed is reached. When the machine is approaching synchronous speed, the frequencies of the rotor and the armature electromotive forces become nearly equal and the phenomenon of so-called "beats" or slow alternate increase and decrease in the current in the starting resistances becomes apparent. This is indicated by the sensitive relay 44 connected across one of the starting resistances 8. The "beats" gradually become slower and finally disappear when the armature is pulled into synchronism by the field. The low voltage relay 44 will therefore alternately open and close its contacts but, when the machine is almost in synchronism, the contacts remain closed for a long period of time.

The closure of the relay contacts 45 causes the energization of the operating coil 46 of a time-lag relay which is so constructed that a predetermined time elapses after its coil is energized before its contacts 47 are closed but the contacts open immediately when the coil is deenergized. It therefore follows that the contacts 47 will not be closed unless the voltage drop across the starting resistor 8 of the alternating-current side of the converter is maintained at a predetermined minimum for a predetermined interval of time which is a true indication that the converter is running in synchronism.

When the contacts 47 of the time-lag relay 46 are closed, the operating coil of a resistor short-circuiting contactor 48 is energized, thus causing the contactor to close. The contactor 48 is provided with three contacts 49 which, when closed, short-circuit the starting resistors 8. An additional contact 51 is provided to establish a circuit, when closed, from the bus-bar 18ª through conductors 40 and 39, contacts 51, contacts 17, and solenoid 10 to the bus-bar 18.

The energizing of the solenoid 10 actuates the slip ring short-circuiting device 9 to short-circuit the slip rings 7. The slip ring short-circuiting device 9 having operated to short-circuit the slip rings, contacts 15, 16 and 17 open and contacts 14 are closed. With the opening of contacts 15, 16 and 17, solenoid 10, the energizing coils of contactors 37 and 48 and relay coil 38 become deenergized so that these contactors and relays are left in a position for again synchronizing the machine the next time it is required to be started up.

The machine is now running in synchronism and the direct-current side is ready to be connected to the direct-current bus-bars. It is usual in automatic substations to do this through a limiting resistance. That method is hereinafter described although any other method of effecting the connection may be employed.

When the direct-current voltage has built up to the normal value, a polarized direct-current voltage relay 52 that is connected across the brushes operates to close its contacts 54. A circuit is then established from the control bus-bar 18, through conductor 25, contacts 14, conductor 53, contacts 54, operating coil of contactor switch 55, conductor 56, and contacts 22, which are closed, to bus-bar 18ª. The direct-current contactor switch 55 therefore closes but it will be observed that this does not happen until the direct-current voltage is normal and the slip rings of the alternating-current side have been short-circuited.

The closure of switch 55 closes an interlock switch 72 which shunts the contacts 21 of the master relay 20 for a purpose hereinafter described. When the contactor switch 55 closes, it connects the direct-current side of the machine to the bus-bars 57 through a limiting resistor 58 which limits the current that the machine can supply, to a value approximating the commutating limit of the machine. If, however, the demand on the substation is below this value an accelerating relay 59 closes its contacts thereby causing the operating coil of a contactor switch 60 to be energized. The circuit for energizing this coil may be traced from the control bus-bar 18, through conductor 25, contacts 14, conductor 53, contacts 54 of the voltage relay 52, contacts of relay 59, operating coil of contactor 60, conductor 56, and contacts 22 to the control bus-bar 18ª. The switch 60 on closing, short-circuits the current limiting resistor 58.

In the event of an overload taking place on the direct-current system, the limiting resistor will be so connected in circuit again by the inverse action of the accelerating relay as to limit the current which the machine can supply. If the overload continues for such time as to cause the current limiting resistance to increase in temperature beyond a predetermined value, a thermal relay 61 will be caused to close its contacts and short-circuit the operating coil of the master relay 20, thereby causing the master relay to open its contacts whereupon the control bus-bars 18 and 18ª will be deenergized and the machine shut down. The machine cannot be started again until the direct-current limiting resistor has cooled down sufficiently to allow the thermal relay to open its contacts.

Connected across the operating coil of the master relay 20, are the contacts of various protective relays which may be provided and which when operated will cause the machine to shut down. These relays may be of the hand restarting type so that when operated the station must be visited by an attendant and the fault corrected before the machine can be started again.

A preferred system of protective relays will now be described which is illustrated in the accompanying drawing, it being understood that various types and arrangements of relays may be used for opening the control circuit of the bus-bars 18 and 18ª on the occurrence of a fault.

A hand resetting relay 62 is employed as an overload protective device, the operating coil of which is supplied with current from a current transformer 63 in the alternating-current mains 3. On the occurrence of an overload, contacts 64 will close, thereby short-circuiting the operating coil of the master relay 20. The relay 62 will operate only at high overload and will, consequently, only operate in the event of a fault on the converter or a "flash-over" on the direct-current commutator. When this relay has operated, it must be reset by hand and the station must therefore be visited before the motor converter can be started again.

An ordinary reverse current relay 65 of the self-resetting type may be provided in the direct-current leads of the bus-bars to prevent the converter from motoring on current supplied from the work circuit. The contacts of the relay 65, when closed, short-circuit the operating coil of the master relay 20, thereby causing the station to shut down.

Another protective relay 66 is provided, this being a time-lag relay of the hand resetting type. When the main alternating-current interrupter 4 is closed, a circuit is maintained from the bus-bar 18ª, through conductor 34, contacts 33, conductor 35, operating coil of relay 66, and contacts 67, which are closed when the switch in series with the resistance 58 in the direct-current circuit is open, to bus-bar 18. Consequently, if a predetermined time elapses after the main alternating-current switch 4 is closed and before the direct-current contactor switch 55 closes, the relay 66 will operate to short-circuit the actuating coil of the master relay 20 to shut down the converter.

If the direct-current contactor switch 55 closes in the normal way, the circuit of the actuating coil of relay 66 will be broken before the contacts 68 of the said relay have had time to close, in which case the actuating coil of the relay 20 will not be short-circuited. The time interval is arranged to be long enough to enable the converter to start and to be supplying load unless a serious fault or mishap occurs.

In order to prevent the converter from increasing its speed to double its normal synchronous speed due to the direct-current field failing to excite, further protective relays 69 and 70 are employed. Relay 69 operates to open its contacts when the current in the field circuit, with which its coil is in series, has built up to a predetermined value. Relay 70 is an induction type relay, the operation of which is dependent upon frequency and independent of voltage over a very wide range. The relay has its controlling electromagnetic coils connected across one of the starting resistors 8 and closes its contacts when the torque on its moving element is increased by reason of a decrease in frequency of the rotor circuit currents below a predetermined value. The contacts of the two relays are in series with the operating coil of a hand resetting relay 71 so that when both the contacts are in closed position simultaneously the relay 71 will be energized to close its switch to short-circuit the actuating coil of the master relay 20 and the station will be shut down, and will so remain until the relay 71 is reset by an attendant.

If the converter has started up, the frequency of the currents in the starting resistors due to the so-called "beats" hereinbefore referred to, will get less and less the nearer the machine approaches synchronism, and consequently the torque on the relay 70 will increase and its contacts will close. If the direct-current field has, however, now built up to its proper value, the contacts of the relay 69 will open, and, these contacts being in series with the contacts of the induction relay 70, the energization of the relay 71 and the shutting down of the converter in response thereto will be prevented.

If the converter has started up, however, and the direct-current field fails to excite, the converter will act purely as an induction motor and reach a speed which may be double the normal synchronous speed. As the converter approaches this speed, the frequency of the currents in the starting resistance will decrease and allow the induction relay 70 to close its contacts. Consequently, the converter will shut down as the relay 69 has failed to operate due to the direct-current field failing to build up.

Another method of preventing the converter from increasing its speed when the direct-current field fails to excite is illustrated in Fig. 2 of the drawings. Relay 70 is not employed. The relay 46 is provided with two sets of contacts, one set 75 of which is in series with the contacts of relay 69. If, therefore, the machine fails to excite and runs up to speed as an induction motor, the voltage across the resistor 8 will fall when the machine approaches synchronous speed and cause relay 44 to close its contacts. Relay 46 then in turn closes its contacts and, no field current being present, the combined closure of the contacts 75 of relay 46 and of the contacts of relay 69 causes the energization of the lockout relay 71 and consequent shutting down of the station, as hereinabove described.

From what has been already described it will be clear that to shut down the machine it is only necessary to deenergize the master relay 20. This will cause contacts 21 and 22 to open thereby deenergizing contactors 55 and 60. As soon as the direct-current contactor switch 55 has opened, an interlock switch 72 which is in parallel with the contacts of the master relay 20 is opened, thereby cutting off the current flowing in conductors 73. Consequently, when both the master relay and the direct-current contactor switch 55 are open, the control bus-bars 18 and 18ª will be deenergized and this will deenergize the no-volt coil 74 connected across the control bus-bars. The deenergization of the no-volt coil causes the alternating-current interrupter 4 to open its contacts, thereby cutting off the supply of alternating-current power from the stator 1 of the induction motor and thus shutting the converter down. It will be seen that by this means the direct-current side of the motor converter is disconnected from the work circuit before the alternating-current side is disconnected from the supply circuit.

This arrangement, the operation of which is herein described, is only an example of apparatus which is employed for carrying out the invention. Various modifications may be made in circuit connections and in particular the relays, contactor switches and other operative devices may be varied considerably in detail and may be of any suitable or well known design, the invention being not limited in these respects to the particular apparatus herein mentioned.

We claim as our invention:

1. The combination with an alternating-current circuit, a direct-current circuit and a motor converter for translating energy therebetween and provided with slip rings for the rotor windings of the motor element, of means for connecting the motor to the alternating-current circuit, a plurality of resistors, means controlled by the connecting means for connecting the resistors in circuit with the rotor windings through the slip rings, and means responsive to the drop across the resistors for short-circuiting the resistors after the motor converter attains its synchronous speed.

2. The combination with an alternating-current circuit, a direct-current circuit and a motor converter for translating energy therebetween and provided with slip rings for the rotor windings of the motor element, of controlling means for effecting the automatic connection of the motor converter between the two circuits comprising an initiating relay, means controlled thereby for connecting the motor to the alternating current circuit and for inserting resistance in the rotor circuits, and means operative when the converter attains its synchronous speed for short-circuiting the rotor windings to render the resistance ineffective.

3. The combination with an alternating-current circuit, a direct-current circuit and a motor converter for translating energy therebetween and provided with stator windings and rotor windings for the motor element, of means for connecting the stator windings of the motor to the alternating-current circuit, means for inserting resistance in the circuit of the rotor windings, means operative when the converter attains its synchronous speed for rendering the resistance ineffective, and means responsive to a condition of the converter element for connecting the converter to the direct-current circuit after the resistance is rendered ineffective.

4. In an electrical system, the combination with a motor converter and means for connecting the motor to a portion of the system, of means for producing a starting torque in the motor and means responsive to a condition of said starting means indicating synchronous speed of the converter for rendering said starting means ineffective and controlling the connection of the converter to the system.

5. The combination with an alternating-current circuit, a direct-current circuit and a motor converter for translating energy therebetween, of means for connecting the motor element to the alternating-current circuit, means for connecting the converter element to the direct-current circuit, means for inserting starting resistance in the rotor circuit of the motor element, means for rendering the starting resistance ineffective, and means for precluding the admission of energy to the converter until the resistance is inserted in the motor rotor circuit and for subsequently precluding the connection of the converter to the direct-current circuit until the starting resistance is rendered ineffective.

6. The combination with an alternating-current circuit, a direct-current circuit and a motor converter for translating energy therebetween, of means for connecting the motor element to the alternating-current circuit, means for connecting the converter element to the direct current circuit, means for inserting resistance in the rotor circuit of the motor, means for subsequently short-circuiting the resistance, and means controlled by said resistance short-circuiting means for controlling the connecting means between the motor converter and both circuits.

7. The combination with an alternating-current circuit, a direct-current circuit and a motor converter for translating energy therebetween comprising a plurality of slip rings, of means for connecting the motor element to the alternating-current circuit, means for connecting the converter element to the direct-current circuit, means for inserting resistance in the rotor circuit of the motor through the slip rings, means for subsequently electrically connecting the slip rings, and means controlled by said means for controlling the connecting means between the motor converter and both circuits.

8. The combination with an alternating-current circuit, a direct-current circuit and a motor converter for translating energy therebetween, of means for connecting the motor element to the alternating-current circuit, means for connecting the converter element to the direct-current circuit, means for inserting resistance in the circuit with the rotor windings of the motor, means for connecting the rotor windings to render the resistance ineffective, and means controlled by said winding connecting means for controlling the connecting means between the motor converter and both circuits.

9. In an electric system, the combination with a motor converter provided with slip rings for the rotor windings of the motor, of a device for electrically connecting the slip rings, means for rendering said device ineffective during starting operation of the motor converter and means responsive to the value of current traversing the slip rings for rendering said device effective after synchronous condition is attained.

10. The combination with an alternating-current circuit, a direct-current circuit and a motor converter for translating energy therebetween, of means for connecting the motor element to the alternating-current circuit, means for connecting the converter element to the direct-current circuit, an initiating relay, a device for electrically connecting the slip rings of the motor, resistance means, means for connecting the resistance means in circuit with the rotor windings, means controlled by the initiating relay for disconnecting the slip rings and operating the resistance connecting means, and means for reconnecting the slip rings and effecting the disconnection of the resistance means.

11. The combination with an alternating current circuit, a direct-current circuit and a motor converter for translating energy therebetween comprising stator and rotor windings for the motor, of means for connecting the stator windings of the motor element to the alternating-current circuit, means for varying the resistances of the circuit of the rotor windings of the motor, means for connecting the converter element to the direct-current circuit, an initiating relay, and means controlled thereby for automatically controlling the resistance-varying means and the connecting means between the motor converter and both circuits.

12. The combination with an alternating-current circuit, a direct-current circuit and a motor converter for translating energy therebetween, of means for automatically connecting the motor converter between the two circuits comprising starting resistance, and means for precluding such connection during the existence of abnormal conditions, comprising means responsive to the field current of the converter and means responsive to a condition of the starting resistance.

In testimony whereof, we have hereunto subscribed our names this 30th day of May, 1923.

THOMAS WYLIE ROSS.
CLIFFORD RYDER.